United States Patent [19]

Jackstadt

[11] 4,430,972

[45] Feb. 14, 1984

[54] RETAINING DEVICE FOR FUEL PUMP PUSH ROD

[76] Inventor: Henry A. Jackstadt, Sycamore, Mo. 65758

[21] Appl. No.: 308,803

[22] Filed: Oct. 5, 1981

[51] Int. Cl.$^3$ ............................................. F02B 77/00
[52] U.S. Cl. ............................... 123/198 R; 123/1 R; 123/198 C; 411/105
[58] Field of Search ............... 411/103, 104, 105, 140; 123/198 C, 1 R, 198 R

[56] References Cited

U.S. PATENT DOCUMENTS

| | | | |
|---|---|---|---|
| 1,110,511 | 9/1914 | Razcliff | 411/140 |
| 1,139,225 | 5/1915 | Pursselley | 411/140 |
| 2,906,311 | 9/1959 | Boyd | 411/105 |
| 2,976,901 | 3/1961 | Heyworth | 411/105 |
| 3,368,602 | 2/1968 | Boyd | 411/105 |
| 3,404,716 | 10/1968 | Cosenza | 411/105 |
| 4,016,914 | 4/1977 | Zurko | 411/105 |
| 4,191,236 | 3/1980 | Duran | 411/105 |

*Primary Examiner*—Ira S. Lazarus
*Attorney, Agent, or Firm*—Norman B. Rainer

[57] ABSTRACT

A device useful in retaining the position of a push rod associated with an engine during removal of a fuel pump is comprised of a hollowed machine bolt and a second bolt associated therewith by spring means. The hollowed bolt is comprised of a polygonal head, an externally threaded shaft extending from the inner face of the head, a cylindrical passageway within the shaft coaxially aligned with the center axis thereof, and a depression recessed into the outer face of the head. The second bolt has a small head and a thin shaft which penetrates the passageway and threadably engages a nut positioned within the recess. A coil spring is disposed about the thin shaft, the extremities of said spring being in abutment with the end of the shaft of the hollowed bolt and the small head of the second bolt.

3 Claims, 5 Drawing Figures

RETAINING DEVICE FOR FUEL PUMP PUSH ROD

BACKGROUND OF THE INVENTION

This invention concerns a retaining device useful in aiding in the removal and remounting of a fuel pump of an internal combustion engine.

In most designs of internal combustion engines having a fuel pump, the fuel pump is mounted to the engine block and positioned such that a push rod within the engine block extends in abutment between a cam shaft and said fuel pump. The push rod thereby drives the pump mechanism at a rate commensurate with the rotational speed of the engine. Because the push rod merely abuts against two opposed members and is not attached to any member, it can easily be dislocated when either of the abutting members is removed. Once such dislocation occurs, repositioning of the push rod is difficult because of its inaccessible location. If, in the course of removing a fuel pump, the mechanic were to insert a conventional machine bolt through a threaded hole in the engine block in an effort to hold the push rod in place, there is the distinct likelihood that the push rod would become warped or scarred. Such happening would render the fuel pump less effective or inoperative.

It is accordingly an object of this invention to provide a device useful in preserving the position of the push rod while removing a fuel pump from its normal mounting position.

It is a further object to provide a device of the aforementioned nature which, if inadvertently left in place after remounting of said fuel pump, would not interfere with the operation of said engine, push rod, or fuel pump.

It is a still further object of the invention to provide a retaining device of the aforementioned nature of simple and rugged construction which can be economically manufactured.

These objects and other objects and advantages of the invention will be apparent from the following description.

SUMMARY OF THE INVENTION

The above and other beneficial objects and advantages are accomplished in accordance with the present invention by an improved retaining device which comprises an outer member comprised of a hollowed machine bolt having a polygonal head, an externally threaded shaft extending from the inner face of said head and terminating in a distal end, a cylindrical passageway within said bolt coaxially aligned with the center axis thereof, and a depression recessed into the outer face of said head, said passageway communicating between said distal end and depression. A second machine bolt is provided having a small head whose outside diameter does not exceed the inside thread diameter of the threaded shaft of said hollowed bolt. A thin shaft extends from the inner face of said small head and terminates in a distal end. The outside diameter of said thin shaft is such as to pass freely within said passageway.

The second machine bolt is positioned such that its shaft enters said passageway at the distal end of the shaft of said hollowed bolt and continues therethrough to threaded engagement with fastening means such as a nut adapted to reside in said depression. A coil spring is disposed about said thin shaft, one extremity of said spring being in abutment with the distal end of the shaft of said hollowed bolt, and the opposite extremity of said spring being in abutment with the inside face of the small head of said second machine bolt.

By virtue of said manner of assembly, the maximum distance of separation between the outer faces of the heads of the two interengaged bolts can be adjusted by changing the extent to which the thin shaft of said second bolt engages the nut. The minimum distance of separation of the outer faces of the heads of the bolts is dependent upon the amount of compressive force applied to said coil spring in the direction of said center axis.

In operation, the threaded shaft of said hollowed bolt engages a threaded hole penetrating an engine housing, causing that portion of the device which contains the small head of the second bolt to be directed into the interior of said housing, and further causing said small head to transversely contact a push rod which normally activates said fuel pump. The push rod is generally disposed within a closely confining guide channel.

Because said small head is in spring-loaded engagement with said hollowed bolt, the push rod is forced against its confining channel and thereby caused to remain in said channel despite removal of the fuel pump.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
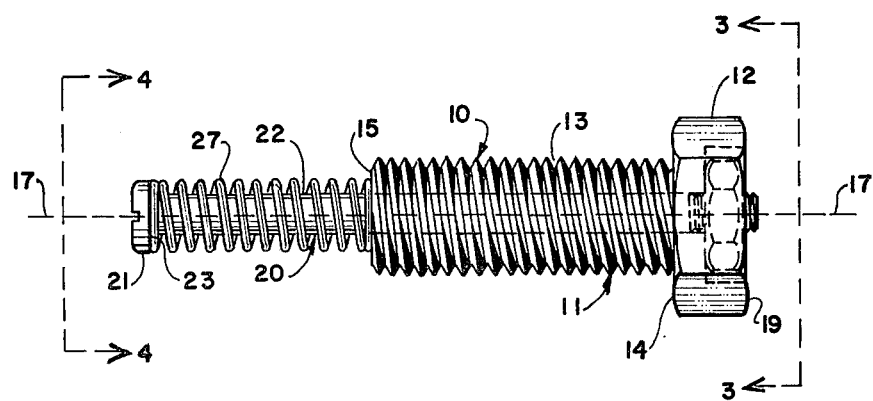
FIG. 1 is a side elevational view of an embodiment of the device of this invention.
Figure 2:
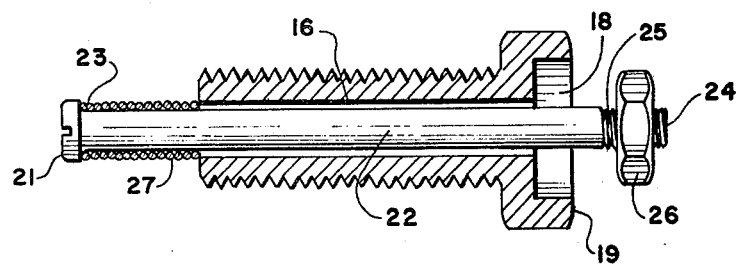
FIG. 2 is a sectional side view of the embodiment of FIG. 1 with the coil spring in a compressed state.
Figure 3:
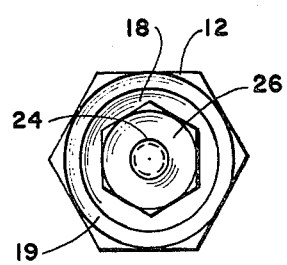
FIG. 3 is an end view taken along the line 3—3 of FIG. 1.
Figure 4:
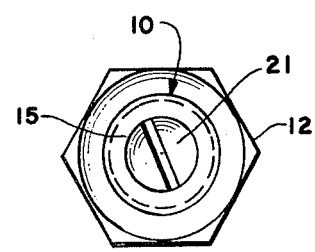
FIG. 4 is an end view taken along the line 4—4 of FIG. 1.

Referring to FIG. 1, an embodiment of the retaining device 10 of the present invention is shown consisting of hollowed machine bolt 11 having a hexagonally shaped head 12, and an externally threaded shaft 13 extending from the inner face 14 of said head and terminating in a distal end 15. A cylindrical passageway 16, shown more clearly in FIG. 2, traverses the interior of bolt 11 in coaxial alignment with the center axis thereof designated by numeral 17 in FIG. 1. A depression 18 is recessed into the outer face 19 of bolt 11. The passageway 16 communicates between the distal end 15 of shaft 13 and the depression 18 in head 12.

A second bolt 20 is provided having a small head 21 whose outside diameter does not exceed the inside thread diameter of threaded shaft 13 of said hollowed bolt. A thin shaft 22 extends from the inner face 23 of bolt 20 and terminates in a distal end 24. Shaft 22 contains external threading 25 at least adjacent its distal end 24, although said threading may continue the entire length of said shaft. The outside diameter of shaft 22 is such as to pass freely within passageway 16 in which it is coaxially positioned. The length of shaft 22 is such that its distal end can extend through depression 18 of head 12.

A nut 26 adapted to be housed within said depression threadably engages shaft 22. A coil spring 27 of substantially cylindrical configuration is disposed about shaft 22 adjacent small head 21, the extremities of said spring being in abutment with the distal end 15 of shaft 13, and the inner face 23 of small head 21. The outside diameter of said spring, namely the diameter taken perpendicularly to the long axis of its cylindrical configuration, is smaller than the inside thread diameter of shaft 13.

Figure 5:
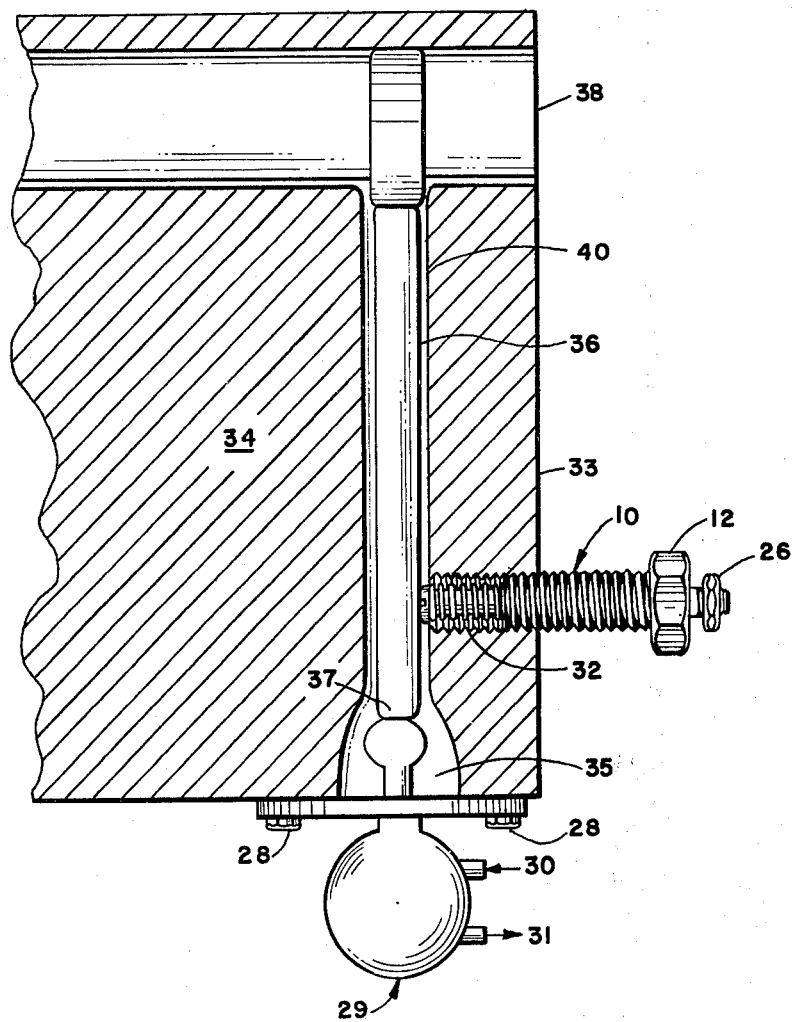
FIG. 5 is a schematic view showing how the retaining device of this invention interacts with a push rod servicing a fuel pump associated with an internal combustion engine.

As shown in FIG. 5, which schematically represents portions of a Chevrolet V-8 engine, a retaining device 10 of this invention engages a threaded hole 32 in a flat exterior wall 33 of housing 34 of said internal combustion engine. Such manner of engagement causes small head 21 of said second bolt to be directed into the interior of housing 34 where it perpendicularly abuts agaist push rod 36 housed within guide channel 40. One extremity of said push rod rides against camshaft 38, and its opposite extremity abuts against lever 35 which drives fuel pump 29 having inlet port 30 and outlet port 31. Said fuel pump 29 is mounted to the engine by bolts 28. When the fuel pump is removed, the force of small head 21 pressing transversely against said push rod prevents the push rod from falling out of the engine housing. Threaded hole 32 is a standard feature of said engine and usually holds a standard machine bolt.

In the operative installation of the device, shaft 13 is threadably inserted into hole 32 until nut 26 rises above face 19. Such positioning indicates that small head 21 is against push rod 36, and spring 27 is in a slightly compressed state.

Because the position of small head 21 is controlled by the tension of spring 27, it can abut with said push rod without causing marking or scarring. In its position of furthest extension from head 12, as shown in FIG. 1, small head 21 will be displaced from the distal end of shaft 13 preferably by a distance equal to between 50% and 100% of the length of shaft 13. Such preferable dimensional configuration of the device has been found to provide best efficiency of utilization with minimal difficulty of installation.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A retaining device for holding a push rod during removal of a fuel pump comprising:
   (a) a hollowed bolt having a polygonal head, an externally threaded shaft extending from the inner face of said head and terminating in a distal end, a cylindrical passageway within said bolt coaxially aligned with the center axis thereof, and a depression recessed into the outer face of said head, said passageway communicating between said distal end and depression,
   (b) a second bolt having a small head whose outside diameter does not exceed the inside thread diameter of the threaded shaft of said hollowed bolt, a thin shaft extending from the inner face of said small head and terminating in a distal end, the outside diameter of said thin shaft being such as to pass freely within said passageway, said second bolt being positioned such that the thin shaft enters said passageway at the distal end of the shaft of said hollowed bolt and continues therethrough into said depression,
   (c) fastening means adapted to be housed within said depression and adapted to adjustably engage the distal end of said thin shaft, and
   (d) a coil spring of substantially cylindrical configuration disposed about said thin shaft, the extremities of said spring being in abutment with the distal end of the shaft of said hollowed bolt and the inner face of the small head of said second bolt, the outside diameter of said spring being less than the inside thread diameter of the threaded shaft of said hollowed bolt,
   (e) whereby force applied axially to said small head in the direction of the polygonal head of said hollowed bolt causes reversible movement of said small head toward said polygonal head.

2. The device of claim 1 wherein said thin shaft threadably engages said fastening means.

3. The device of claim 2 wherein said thin shaft is between about 50% and 100% longer than said externally threaded shaft.

* * * * *